United States Patent [19]

Daughenbaugh, Jr.

[11] Patent Number: 4,701,517

[45] Date of Patent: Oct. 20, 1987

[54] VINYL AROMATIC/TERPENE/PHENOL TERPOLYMER

[75] Inventor: Norman E. Daughenbaugh, Jr., Turtle Creek, Pa.

[73] Assignee: Hercules Incorporated, Wilmington, Del.

[21] Appl. No.: 839,841

[22] Filed: Mar. 13, 1986

[51] Int. Cl.$^4$ .............................................. C08G 83/00
[52] U.S. Cl. .................................... 528/205; 428/484; 428/523; 524/77; 524/508; 524/575; 524/611; 528/392
[58] Field of Search .................. 528/205, 392; 524/77, 524/508, 611, 575; 428/484, 523

[56] References Cited

U.S. PATENT DOCUMENTS

| | | | |
|---|---|---|---|
| 3,692,844 | 9/1972 | Hollis et al. | 260/619 |
| 4,357,459 | 11/1982 | Runavot et al. | 528/205 |
| 4,412,030 | 10/1983 | Runavot et al. | 524/505 |

FOREIGN PATENT DOCUMENTS

| | | |
|---|---|---|
| 75771 | 4/1983 | European Pat. Off. . |
| 54-123143 | 9/1979 | Japan . |
| 55-060539 | 5/1980 | Japan . |
| 57-036108 | 2/1982 | Japan . |

*Primary Examiner*—Harold D. Anderson
*Attorney, Agent, or Firm*—Joanne W. Patterson

[57] ABSTRACT

Disclosed are terpolymers having a Ring and Ball softening point of 69° C. to 130° C. prepared from a vinyl-substituted aromatic hydrocarbon, a monoterpene hydrocarbon and a phenol. The terpolymers are useful as tackifiers in adhesive compositions.

14 Claims, No Drawings

VINYL AROMATIC/TERPENE/PHENOL TERPOLYMER

FIELD OF THE INVENTION

This invention relates to novel terpolymers which are particularly adapted for use as tackifiers in adhesive compositions.

SUMMARY OF THE INVENTION

The vinyl-substituted aromatic/terpene/phenol terpolymers of this invention have a Ring and Ball softening point of about 69° C. to about 130° C. are prepared from a mixture of monomers comprising, by weight, (1) from about 12% to about 95% of at least one vinyl-substituted aromatic hydrocarbon having the general formula

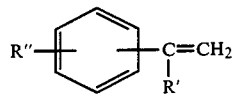

where R' is hydrogen or —CH$_3$ and R" is hydrogen, a —CH═CH$_2$ group or a 1-10 C alkyl group, (2) from about 5% to about 75% of at a least one monoterpene hydrocarbon, and (3) from about 0.75% to about 50% of at least one phenol, based on the monomer charge. The vinyl-substituted aromatic component and the monoterpene component can be linked to each other as well as to the phenol component in the polymer chain.

DETAILED DESCRIPTION OF THE INVENTION

The vinyl-substituted aromatic hydrocarbons (1) for use in preparing the terpolymers of this invention have the general formula

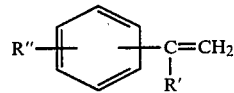

where R' is hydrogen or —CH$_3$ and R" is hydrogen, a —CH═CH$_2$ group or a 1-10 C alkyl group. Suitable vinyl-substituted aromatic hydrocarbons include, but are not limited to, styrene, alpha-methylstyrene, para-methylstyrene, vinyltoluene, tert-butylstyrene, alpha-p-dimethylstyrene, and divinylbenzene. Styrene is preferred. Mixtures of two or more vinyl-substituted aromatic hydrocarbons can be used as component (1) if desired. The vinyl-substituted aromatic hydrocarbon is used in an amount of from about 12% to about 95% by weight, preferably from about 21% to about 77% by weight, based on the total monomer charge.

Monoterpene hydrocarbons (2) for use in preparing the terpolymers of this invention include, but are not limited to, alpha-pinene, beta-pinene, dipenetene, limonene and camphene. Alpha-pinene is preferred. Mixtures of two or more monoterpene hydrocarbons can be used as component (2) if desired. The monoterpene hydrocarbon is used in an amount of from about 5% to about 75% by weight, preferably from about 19% to about 65%, based on the total monomer charge.

The phenols (3) for use in preparing the terpolymers of this invention have at least one unsubstituted C atom in the positions ortho or para to the -OH group and include, but are not limited to, phenol and alkyl-substituted phenols such as para-nonylphenol, meta-cresol, ortho-cresol and bisphenol A. Phenol is preferred. Mixtures of two or more phenols can be used as component (3) if desired. The phenol is used in an amount of from about 0.75% to about 50% by weight, preferably from about 3% to about 40% by weight, based on the total monomer charge.

It will be obvious to one skilled in the art that the sum of the percentages of components (1), (2) and (3) will equal 100%.

In this specification, all parts and percentages are by weight unless otherwise indicated.

In the terpolymers of this invention the vinyl-substituted aromatic component and the monoterpene component couple with the phenol component as well as with each other, so that the phenol is an integral part of the polymer chain. The sites on the phenol that are available for reaction with the vinyl-substituted aromatic component and the monoterpene component include the —OH group, and any unsubstituted carbon atoms in positions ortho and para to the —OH group. Thus in phenol itself, there are four reactive sites where coupling with the other two components of the monomer charge can occur.

There are several suitable procedures for preparing the terpolymers. In one procedure, the monomer blend and catalyst are added with agitation to the solvent in the reaction vessel via separate inlets. The temperature is controlled by an external cooling bath. In this procedure sufficient catalyst is added to initiate the reaction. In a second procedure, solvent and all monomers are initially present in the reaction vessel. Reaction is initiated by the intermittent addition of small quantities of catalyst until an exotherm results of magnitude such that it can be controlled by the external cooling bath. Another procedure may be used when the monomer charge contains 20% by weight or more of the phenol component. This procedure involves the formation of a complex of the phenol component and the BF$_3$ catalyst in the solvent, followed by slow addition of a solution of the vinyl-substituted aromatic component and the monoterpene component to the solution of the BF$_3$/phenol complex. In any procedure, after the reaction is complete, the catalyst is neutralized by reacting it with aqueous caustic or lime. The product is then isolated after removing solvent and any other volatiles.

The reaction temperature is from about −15° C. to about +65° C., preferably from about 0° C. to about +50° C.

Suitable catalysts include BF$_3$, BCl$_3$, and complexes of BF$_3$ with, for example, water, ethyl alcohol, H$_3$PO$_4$, phenol or ether. BF$_3$ is preferred.

The solvent used is inert under polymerization conditions and includes aliphatic or preferably aromatic hydrocarbons such as toluene or xylene, or blends of aromatic hydrocarbons such as Exxon Aromatic 100.

The terpolymers prepared in accordance with this invention are light in color (Gardner 1 to 5). Their stability to color darkening in air at elevated temperatures may be improved by the addition of small amounts of antioxidant materials such as dilauryl thiodipropionate or distearyl thiodipropionate.

The terpolymers will generally have softening points (Ring and Ball, ASTM Method E-28) from about 69° C. to about 130° C. A low molecular weight product is desirable, i.e., the weight average molecular weight of the terpolymers is typically from about 500 to about 2000. Low molecular weight products are normally more soluble in any given adhesive composition than a high molecular weight product would be.

The terpolymers of this invention can be used as tackifiers in adhesive compositions. The compatibility of the terpolymer with the adhesive composition in which it is to be used can be controlled by adjusting the ratio of the three components of the monomer charge. For example, if the adhesive composition is predominantly aromatic in nature, a larger proportion of the vinyl-substituted aromatic component will be used. If the adhesive composition is predominantly aliphatic in nature, a larger proportion of the terpene component will be used. The compatibility can be further controlled by varying processing conditions such as reaction time, reaction temperature and the type of catalyst used. These processing conditions influence the molecular weight of the terpolymer product and its softening point.

One type of adhesive composition in which the terpolymers can be used is a solvent-based pressure-sensitive adhesive. Such an adhesive may be prepared using the terpolymers and an elastomeric polymer such as natural rubber, styrene-butadiene (SBR), styrene-isoprene-styrene (SIS), and styrene-butadiene multiblock copolymers. The terpolymer and the elastomer are dissolved in a solvent such as toluene. An antioxidant such as tetrakis[methylene- (3,5-di-tert-butyl-4-hydroxyhydrocinnamate)]methane (Irganox 1010, Ciba Geigy) and other stabilizers may be included in the composition if desired.

Another type of adhesive composition in which the terpolymers can be used is a hot melt pressure-sensitive adhesive. Such adhesives may be prepared, for example, by dissolving the terpolymer, an elastomer such as those mentioned in the preceding paragraph, and an antioxidant in a naphthenic plasticizer at an elevated temperature.

Still another type of adhesive composition in which the terpolymers can be used is a nonpressure-sensitive hot melt adhesive. The components of such an adhesive composition are hot-blended and may be, for example, the terpolymer, microcrystalline wax and an elastomer such as an ethylene/vinyl acetate copolymer.

In any of these adhesive compositions the weight ratio of terpolymer to elastomer is determined by the use for which the composition is intended.

The terpolymers of this invention may also be used as viscosity modifiers for coating compositions and as modifiers for printing inks. As hindered phenolic materials, the terpolymers may also be useful as oxidative stabilizers for other polymers.

The following examples are illustrative of the invention and are not intended to limit its scope in any way.

EXAMPLE 1

A one-liter, three-neck reaction vessel is equipped with a mechanical stirrer, thermometer well, addition funnel, inlet tube to feed catalyst beneath the liquid surface and provision for dry nitrogen blanketing. The reaction vessel is charged with 270 g dry aromatic solvent and flushed with dry nitrogen while cooling as the contents are brought to 0° C. by means of an external dry ice/isopropanol cooling bath. A mixture of 120 g dry styrene and 180 g dry alphapinene is blended with 30 g pure phenol dissolved in 30 g aromatic solvent to form a monomer solution. The monomer solution is added to the reaction vessel at 0° C. over a period of 36 minutes while simultaneously adding 4.3 g gaseous $BF_3$ catalyst. Catalyst addition is continued another 14 minutes until 6.0 g total $BF_3$ is added. The reaction mixture is heated to 40° C. and stirring is continued for one hour. The catalyst is removed by neutralizing with 110 ml of hot caustic solution followed by three hot water washes. The aqueous phase is separated and discarded. The organic phase is heated under nitrogen while removing solvent and finally sparged with superheated steam at 225° C. to isolate the terpolymer product. The resulting terpolymer has a Ring and Ball softening point of 106° C. and Gardner color of 4+ and is obtained in 92% yield.

The aromatic solvent used in Examples 1–13 is a recycled blend of various aromatic compounds, the main components of which are para- and meta-xylene (10.6%), para- and meta-ethytoluene (13.8%), mesitylene (7.0%), pseudocumene (9.5%), hemimellitene (7.2%), and higher boiling components (13.6%).

EXAMPLE 2

A one-liter, three-neck reaction vessel is equipped with a mechanical stirrer, thermometer well, provision for dry nitrogen blanketing and an adjustable inlet tube to feed catalyst beneath the liquid surface. The reaction vessel is charged with 180 g dry styrene, 120 g dry alpha-methylstyrene, 30 g dry alpha-pinene, 313 g dry aromatic solvent bend, and 15 g phenol. Under nitrogen, the temperature is adjusted to 0° C. by means of an external dry ice/isopropanol bath. Gaseous $BF_3$ (0.48 g) is then introduced intermittently over a period of 15 minutes. A strong exotherm results which is controlled at 0° to +5° C. After this exotherm subsides, $BF_3$ addition is continued until 0.86 g total $BF_3$ is added to the reaction vessel. The reaction mixture is then heated to 40° C. After 1 hour, excess lime is added to neutralize the catalyst. The temperature is raised to 100° C. and lime and neutralization products are removed by filtration. The terpolymer is isolated by heating under nitrogen and finally sparging at 225° C. with superheating steam. A terpolymer with a Ring and Ball softening point of 119° C. and Gardner color 1+ is obtained in 91.4% yield.

EXAMPLE 3

The reaction apparatus is the same as the one described in Example 1. The reaction vessel is charged with 300 g dry aromatic solvent, flushed with dry nitrogen, and the contents cooled to 0° C. A solution of 30 g phenol in 120 g dry styrene and 180 g dry beta-pinene is added dropwise to the reaction vessel at 0° C. over 35 minutes while simultaneously adding 4.2 g gaseous $BF_3$. The reaction mixture is allowed to warm to 20° C. over a 1 hour period and the catalyst is then neutralized with excess lime. The temperature is raised to 100° C. After filtration, the organic phase is heated under nitrogen and finally sparged with steam at 225° C. A terpolymer with a Ring and Ball softening point of 102° C. and a Gardner color of 5− is obtained in 89.4% yield.

EXAMPLE 4

The reaction apparatus is the same as the one described in Example 1. The reaction vessel is charged with 150 g dry aromatic solvent, flushed with dry nitrogen and the contents cooled to 0° C. A solution of 15 g phenol in 210 g dry styrene with 90 g dry dipentene and 150 g dry aromatic solvent is added dropwise to the reactor at 0° C. over a 1 hour period while simultaneously adding 7.2 g gaseous BF$_3$ catalyst. The reaction mixture is allowed to warm to +15° C. while stirring for an additional hour, and the catalyst is then neutralized with excess lime. The temperature is raised to 100° C. Lime and neutralization products are removed by filtration. The organic phase is heated under nitrogen and finally sparged with steam at 250° C. A terpolymer with a Ring and Ball softening point of 110° C. and a Gardner color of 3+ is obtained in 91.5% yield.

EXAMPLE 5

The reaction apparatus is the same as the one described in Example 1. Dry aromatic solvent (277 g) is placed in the reaction vessel. After flushing with dry nitrogen, the contents of the vessel are stirred and cooled at 0° C. while a solution of 15 g phenol in 210 g dry styrene and 90 g dry alpha-pinene is added over a period of 34 minutes. During monomer addition, 4.1 g gaseous BF$_3$ is also continuously added to the reaction medium. The mixture is heated to 40° C. and held at this temperature for 1 hour. Lime is used for neutralization of the catalyst. The terpolymer product is isolated by filtration, followed by distillation of solvent under nitrogen and finally steam sparging at 260° C. A terpolymer with a Ring and Ball softening point of 97° C. and a Gardner color of 1 is obtained in 92.0% yield.

EXAMPLE 6

The reaction apparatus is the same as the one described in Example 2. The reaction vessel is charged with 172.8 g dry styrene, 57.6 g dry alpha-pinene, 4.8 g divinylbenzene, 9.6 g phenol and 360 g dry aromatic solvent. The contents are cooled to 0° C. under nitrogen and 0.86 g gaseous BF$_3$ is introduced intermittently over a period of 28 minutes. A controlled (0° to +2° C.) strong exotherm lasting from 20 minutes results. After the exotherm subsides, BF$_3$ addition is continued until 1.1 g total catalyst are added. Stirring is continued at 0° C. for 30 minutes. Neutralization of the catalyst with excess lime is followed by filtration at 100° C. The organic phase is heated under nitrogen to remove solvent and finally sparged with steam at 245° C. A terpolymer with a Ring and Ball softening point of 116° C. and a Gardner color of 1- is obtained in 95.4% yield.

EXAMPLE 7

The reaction apparatus is the same as the one described in Example 1. Dry aromatic solvent (300 g) is charged to the reaction vessel and the contents are brought to 0° C. under nitrogen. A blend of 15 g phenol in 210 g dry vinyltoluene and 90 g dry alpha-pinene is added with agitation at 0° C. over a period of ½ hour. During this time 3.6 g gaseous BF·catalyst is also continuously added to the reactor. The temperature is allowed to increased to 20° C. during the next hour and the catalyst is then neutralized with excess lime. After heating to 100° C. and filtering, the organic phase is stripped of solvent under nitrogen and steam sparged at 250° C. A terpolymer having a Ring and Ball softening point at 110° C. and a Gardner color of 1 is obtained in 91.7% yield.

EXAMPLE 8

The reaction apparatus and general procedure are the same as those described in Example 1. To the reaction vessel containing 284.5 g aromatic solvent maintained at 0° C. is added a solution of 192 g styrene, 108 g alpha-pinene and 18 g phenol over a ½ hour period while 3.8 g BF$_3$ is also added. After an additional hour of reaction at 40° C., the catalyst is neutralized. A terpolymer with a Ring and Ball softening point of 97° C. and a Gardner color of 3— is isolated in 97.6% yield.

EXAMPLE 9

The reaction apparatus is the same as the one described in Example 1. A solution of 180 g styrene, 120 g alpha-pinene, and 30 g para-nonlyphenol is added to a reaction vessel containing 300 g dry aromatic solvent and maintained at 25° C. for one hour. BF$_3$ (8.4 g) is also passed into the reaction mixture. After one additional hour at 25° C., the catalyst is neutralized. A terpolymer with a Ring and Ball softening point of 80° C. and Gardner color of 1+ is isolated in 85.6% yield.

EXAMPLE 10

The reaction apparatus is the same as the one described in Example 1. BF$_3$ catalyst is passed into a reaction vessel containing 300 g dry aromatic solvent maintained at 25° C. A solution of 180 g styrene, 120 g alpha-pinene and 30 g ortho-cresol is added over a one hour period. After an additional hour of reaction time, the catalyst is neutralized. A terpolymer with a Ring and Ball softening point of 85° C. is obtained in 84.1% yield.

EXAMPLE 11

The reaction apparatus is the same as the one described in Example 2. The reaction vessel is charged with 180 g sytrene, 120 g alpha-pinene, 30 g bisphenol A and 400 g aromatic solvent and the contents are brought to 40° C. BF$_3$ (2.6 g) is added over a two hour period during which time the bisphenol A gradually dissolves in the reaction medium. After an additional 20 minute induction period, a strong exotherm results. When this exotherm subsides, the reaction is contained another 1.5 hours at 40° C. The catalyst is then neutralized. A terpolymer with a softening point of 90° C. and Gardner color of 3+ is isolated in 84.1% yield.

EXAMPLE 12

The reaction apparatus and general procedure are the same as those described in Example 1. To a reaction vessel containing 300 g aromatic solvent maintained at 0° C. is added a solution of 180 g dry styrene, 120 g alpha-methylstyrene, 15 g alpha-pinene and 2.5 g phenol over a ½ hour period while simultaneously adding 3.8 g BF$_3$. After an additional hour at 40° C., the catalyst is neutralized. A terpolymer having a Ring and Ball softening point of 69° C. and a Gardner color of 1 is isolating in 93.8% yield.

EXAMPLE 13

The reaction apparatus is the same as the one described in Example 1. The reaction vessel is charged with 63 g of phenol dissolved in 300 g aromatic solvent. At 25° C., 1.5 g BF$_3$ is passed into the reaction vessel to form a soluble complex with the phenol. While maintaining a reaction temperature of 25° C., a solution of 63 g styrene and 174 g alpha-pinene is added to the stirred reaction vessel over a 3.3 hour period. After an additional 0.5 hr, the catalyst is neutralized. A terpolymer having a Ring and Ball softening point of 129° C. and a Gardner color of 4+ is isolated in 87.4% yield.

EXAMPLE 14

Sovlent-based pressure sensitive adhesive compositions are prepared by the following procedure.

40 Parts by weight of terpolymer prepared according to Example 1 are mixed in a glass jar with 60 parts by weight of a milled natural rubber (Pale Crepe containing 1% by weight p,p'-dioctyldiphenylamine) and 0.3 parts by weight antioxidant (Irganox 1010, Ciba Geigy) in 733 parts toluene by tumbling for 3 to 4 days. This procedure is repeated for two additional samples using weight ratios of terpolymer to rubber of 50:50 and 60:40. The adhesives are cast as a 1.0 mil film on a Mylar substrate, air dried and finally oven dried at 60°-70° C. for 5 minutes. Once cool, release paper is applied to the adhesives and they are stored at 22° C. and 50% relative humidity. Adhesive testing is performed after storage for 24 hours. The Pressure Sensitive Tape Council (PSTC) tests used and the test results are given below.

| Terpolymer:Elastomer Ratio | 40:60 | 50:50 | 60:40 |
|---|---|---|---|
| Peel Strength (oz/in) (PSTC-1) | 28 | 53 | 101 |
| Quick Stick (oz/in) (PSTC-5) | 20 | 33 | 68 |
| Rolling Ball Tack (cm) (PSTC-6) | 1.9 | 6.1 | >25 |
| Shear Adhesion (min) (PSTC-7) | 2015 | 1210 | 300 |

EXAMPLE 15

A solvent-based pressure-sensitive adhesive is prepared by the following procedure.

40 Parts by weight of the terpolymer prepared according to Example 5, 60 parts by weight of a styrene-butadiene elastomer (Ameripol SBR 1011, B. F. Goodrich Co.) and 0.3 parts by weight antioxidant (Irganox 1010, Ciba Geigy) are dissolved in 900 parts toluene by tumbling for 3 to 4 days. The adhesive is cast as a 1.0 mil film on a Mylar substrate, air dried and finally oven dried at 60°-70° C. for 5 minutes. When cool, release paper is applied to the adhesive and it is stored at 22° C. and 50% relative humidity. Adhesive testing is performed after storage for 24 hours with the followings results:

| Peel Strength | 61 oz/in |
|---|---|
| Quick Stick | 32 oz/in |
| Rolling Ball Tack | 4.1 cm |
| Shear Adhesion | 2614 minutes |

EXAMPLE 16

A hot melt pressure-sensitive adhesive is prepared by the following procedure.

60 Parts by weight of the terpolymer prepared according to Example 8 are mixed, while blanketed with nitrogen, with 20 parts plasticizing oil (Shellflex 371) and 0.5 part antioxidant (Irganox 1010, Ciba Geigy) and heated to 175° C. 40 Parts by weight of a butadiene-styrene multiblock copolymer (Stereon 840A, Firestone Co.) are added and mixing is continued until homogeneity is attained. The adhesive is cast as a 1 mil film on a Mylar substrate at 350° F. Once cool, release paper is applied to the adhesive film and it is stored at 22° C. and 50% relative humidity. Adhesive testing is performed after storage for 24 hours with the following results:

| Peel Strength | 73 oz/in |
|---|---|
| Quick Stick | 55 oz/in |
| Rolling Ball Tack | >30 cm |

EXAMPLE 17

The terpolymers of this invention can also be used in nonpressure-sensitive hot melt adhesive compositions. 70 Parts by weight of paraffin wax (Chevron 155), 105 parts by weight ethylene/vinyl acetate (Elvax 220, Du Pont Co.), 175 parts by weight of the terpolymers shown in the Table and antioxidant are heated and stirred under nitrogen until homogeneous. Cloud point data and heat aging data for the hot melt adhesive compositions are given in the Table.

TABLE

NONPRESSURE-SENSITIVE HOT MELT ADHESIVE EVALUATIONS

| Terpolymer | Wt. % DLTDP* | Cloud Point, °C. | Melt Viscosity at 350° F. (cps) | | | Molten Gardner Color on Aging in a Forced Air Oven-Intervals @ 350° F.** | | | |
|---|---|---|---|---|---|---|---|---|---|
| | | | Initial | After 24 hr | 96 hr | 0 hr | 8 hr | 24 hr | 48 hr |
| Example 1 | 0.5 | 72 | 795 | 805 | 885 | 3+ | 4− | 7− | 12− |
| Example 5 | 0.25 | 76 | 775 | 815 | 955 | 4+ | 5+ | 6+ | 10+ |
| Example 8 | 0.25 | 77 | 730 | 800 | 935 | 4 | 5 | 6+ | 10+ |

*Diauryl thiodipropionate antioxidant
**Approximately 200 g aged in an uncovered 400 ml glass beaker

What I claim and desired to protect by Letters Patent is:

1. A vinyl-substituted aromatic/terpene/phenol terpolymer having a Ring and Ball softening point of from about 69° C. to about 130° C. prepared from a mixture of monomers comprising, by weight, (1) from about 12% to about 95% of at least one vinyl-substituted aromatic hydrocarbon having the general formula

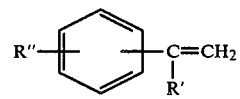

where R' is hydrogen or —CH$_3$ and R" is hydrogen, a —CH=CH$_2$ group or a 1–10 C alkyl group, (2) from about 5% to about 75% of at least one monoterpene hydrocarbon and (3) from about 0.75% to about 50% of at least one phenol, based on the monomer charge.

2. The terpolymer of claim 1 wherein the vinyl-substituted aromatic hydrocarbon (1) is styrene.

3. The terpolymer of claim 1 wherein the monoterpene hydrocarbon (2) is alpha-pinine.

4. The terpolymer of claim 1 wherein the phenol (3) is phenol.

5. A process for preparing a vinyl-substituted aromatic/terpene/phenol terpolymer having a Ring and Ball softening point of from about 69° C. to about 130° C. comprising reacting a mixture of monomers comprising, by weight, (1) from about 12% to about 95% of at least one vinyl-substituted aromatic hydrocarbon having the general formula

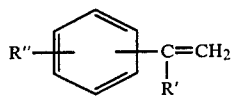

where R' is hydrogen or —CH₃ and R" is hydrogen, a —CH=CH₂ group or a 1-10 C alkyl group, (2) from about 5% to about 75% of at least one monoterpene hydrocarbon and (3) from about 0.75% to about 50% of at least one phenol, based on the monomer charge, in a solvent in the presence of a catalyst.

6. The process of claim 5 wherein the catalyst is BF₃.

7. The process of claim 5 wherein the vinyl-substituted aromatic hydrocarbon (1) is styrene, the monoterpene hydrocarbon (2) is alpha-pinene and the phenol (3) is phenol.

8. The process of claim 5 wherein the reaction is carried out at a temperature of from about −15° C. to about +65° C.

9. In a solvent-based pressure-sensitive adhesive composition comprising an elastomer, a tackifier, and a solvent, the improvement wherein the tackifier is a vinyl-substituted aromatic/terpene/phenol terpolymer having a Ring and Ball softening point of from about 69° C. to about 130° C. prepared from a mixture of monomers comprising, by weight, (1) from about 12% to about 95% of at least one vinyl-substituted aromatic hydrocarbon having the general formula

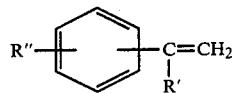

where R' is hdyrogen or —CH₃ and R" is hydrogen, a —CH=CH₂ group or a 1-10 C alkyl group, (2) from about 5% to about 75% of at least one monoterpene hydrocarbon and (3) from about 0.75% to about 50% of at least one phenol, based on the monomer charge.

10. The adhesive composition of claim 9 wherein the terpolymer comprises styrene, alpha-pinene and phenol.

11. In a nonpressure-sensitive hot melt adhesive composition comprising a wax selected from the group consisting of microcrystalline wax and paraffin wax, an elastomer, and a tackifier, the improvement wherein the tackifier is a vinyl-substituted aromatic/terpene/phenol terpolymer having a Ring and Ball softening point of from about 69° C. to about 130° C. prepared from a mixture of monomers comprising, by weight, (1) from about 12% to about 95% of at least one vinyl-substituted aromatic hydrocarbon having the general formula

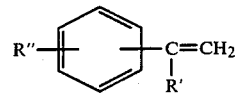

where R' is hydrogen or —CH₃ and R" is hydrogen, a —CH=32 CH₂ group or a 1-10 C alkyl group, (2) from about 5% to about 75% of at least one monoterpene hydrocarbon and (3) from about 0.75% to about 50% of at least one phenol, based on the monomer charge.

12. The adhesive composition of claim 11 wherein the terpolymer comprises styrene, alpha-pinene, and phenol.

13. In a hot melt pressure-sensitive adhesive composition comprising an elastomer, a tackifier and a plasticizing oil, the improvement wherein the tackifier is a vinyl-substituted aromatic/terpene/phenol terpolymer having a Ring and Ball softening point of from about 69° C. to about 130° C. prepared from a mixture of monomers comprising, by weight, (1) from about 12% to about 95% of at least one vinyl-substituted aromatic hydrocarbon having the general formula

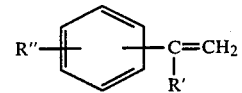

wherein R' is hydrogen or —CH₃ and R" is hydrogen, a —CH=CH₂ group or a 1-10 C. alkyl group, (2) from about 5% to about 75% of at least one monoterpene hydrocarbon and (3) from about 0.75% to about 50% of at least one phenol, based on the monomer charge.

14. The adhesive composition of claim 13 wherein the terpolymer comprises styrene, alpha-pinene and phenol.

* * * * *

UNITED STATES PATENT AND TRADEMARK OFFICE
CERTIFICATE OF CORRECTION

PATENT NO. : 4,701,517            Page 1 of 2
DATED      : October 20, 1987
INVENTOR(S): Norman E. Daughenbaugh, Jr It is certified that error appears in the above-identified patent and that said Letters Patent is hereby corrected as shown below:

Column 4 - Line 29     " bend "

Should read     -- blend --

Column 4 - Line 41     " superheating "

Should read     -- superheated --

Column 5 - Line 61     " at 110°C "

Should read     -- of 110°C --

UNITED STATES PATENT AND TRADEMARK OFFICE
CERTIFICATE OF CORRECTION

PATENT NO. : 4,701,517

DATED : October 20, 1987

INVENTOR(S) : Norman E. Daughenbaugh, Jr.

It is certified that error appears in the above-identified patent and that said Letters Patent is hereby corrected as shown below:

Column 10 - Line 20     " $-CH=32CH_2$ group "

Should read     -- $-CH=CH_2$ group --

Signed and Sealed this

Nineteenth Day of April, 1988

Attest:

DONALD J. QUIGG

*Attesting Officer*        *Commissioner of Patents and Trademarks*

UNITED STATES PATENT AND TRADEMARK OFFICE
CERTIFICATE OF CORRECTION

PATENT NO. : 4,701,517

DATED : October 20, 1987

INVENTOR(S) : Norman E. Daughenbaugh, Jr.

It is certified that error appears in the above-identified patent and that said Letters Patent is hereby corrected as shown below:

Column 1 - Line 59    " dipenetene "

should read    -- dipentene --

Column 3 - Line 66    " alphapinene "

should read    -- alpha-pinene --

Column 4 - Line 2     " gaseaous "

should read    -- gaseous --

Column 4 - Line 18    " ethytoluene "

should read    -- ethyltoluene --

Column 5 - Line 37    " from "

should read    -- for --

Column 5 - Line 54    " BF "

should read    -- $BF_3$ --

UNITED STATES PATENT AND TRADEMARK OFFICE
CERTIFICATE OF CORRECTION

PATENT NO. : 4,701,517

DATED : October 20, 1987

INVENTOR(S) : Norman E. Daughenbaugh, Jr.

It is certified that error appears in the above-identified patent and that said Letters Patent is hereby corrected as shown below:

Column 5 - Line 56   " increased "

should read   -- increase --

Column 6 - Line 11   " nonlyphenol "

should read   -- nonylphenol --

Column 6 - Line 32   " sytrene "

should read   -- styrene --

Column 6 - Line 39   " contained "

should read   -- continued --

Column 6 - Line 54   " isolating "

should read   -- isolated --

Column 7 - Line 3   " Sovlent "

should read   -- Solvent --

UNITED STATES PATENT AND TRADEMARK OFFICE
CERTIFICATE OF CORRECTION

PATENT NO. : 4,701,517
DATED : October 20, 1987
INVENTOR(S) : Norman E. Daughenbaugh, Jr.

It is certified that error appears in the above-identified patent and that said Letters Patent is hereby corrected as shown below:

Column 7 - Line 43     " *Diauryl "
    Should read        -- *Dilauryl --

Column 7 - Line 61     " followings "
    Should read        -- following --

Column 8 - Line 46     " desired "
    Should read        -- desire --

Column 8 - Line 68     " alpha-pinine "
    Should read        -- alpha-pinene --

Column 9 - Line 46     " hdyrogen "     should read -- hydrogen --

Signed and Sealed this

Fourteenth Day of June, 1988

*Attest:*

DONALD J. QUIGG

*Attesting Officer*     *Commissioner of Patents and Trademarks*